No. 723,996. PATENTED MAR. 31, 1903.
S. R. ESTEP.
INSECT TRAP.
APPLICATION FILED OCT. 20, 1902.
NO MODEL.
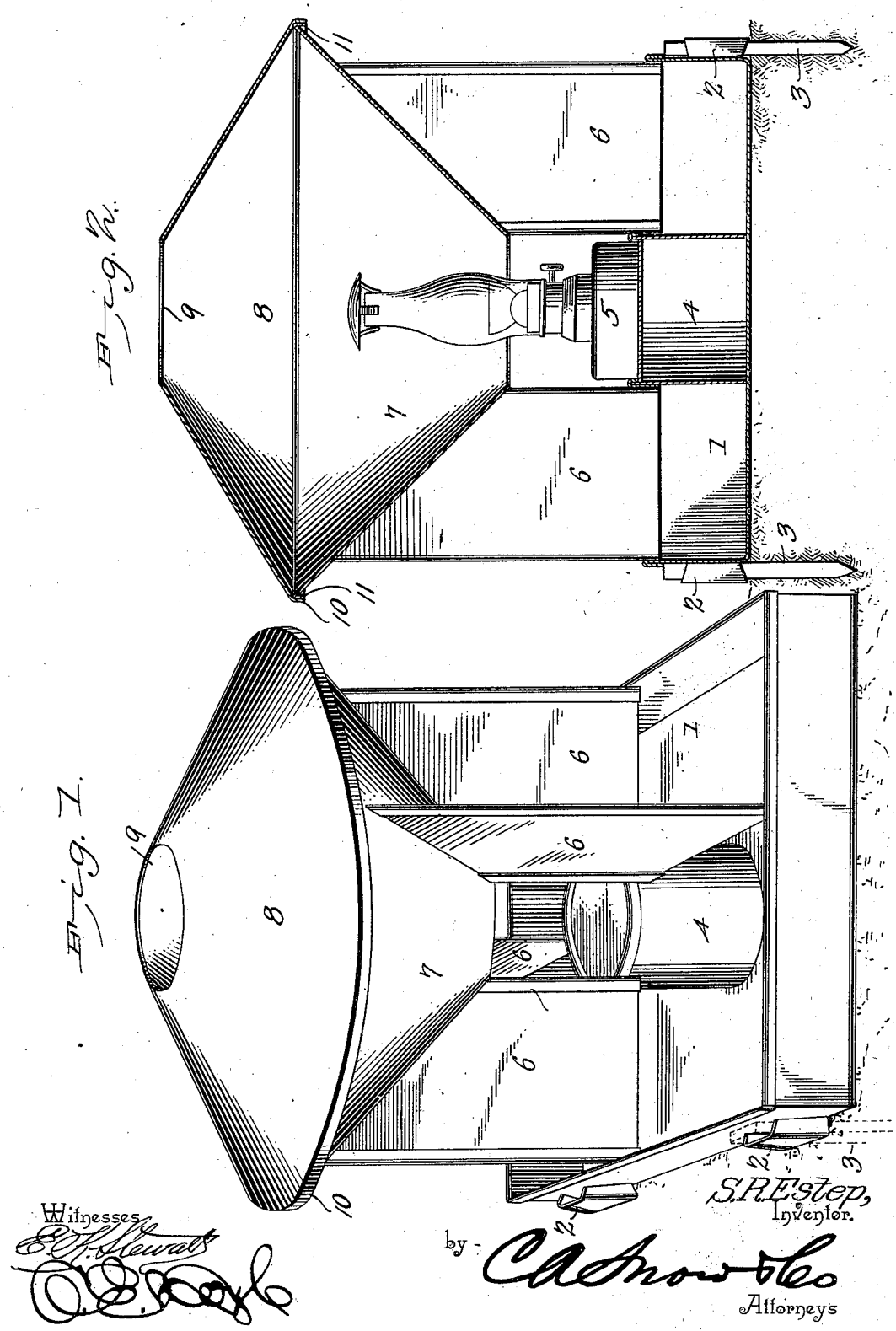

UNITED STATES PATENT OFFICE.

SAMUEL RICHARD ESTEP, OF DENISON, TEXAS.

INSECT-TRAP.

SPECIFICATION forming part of Letters Patent No. 723,996, dated March 31, 1903.

Application filed October 20, 1902. Serial No. 128,034. (No model.)

*To all whom it may concern:*

Be it known that I, SAMUEL RICHARD ESTEP, a citizen of the United States, residing at Denison, in the county of Grayson and State of Texas, have invented a new and useful Insect-Trap, of which the following is a specification.

The invention relates to insect-traps especially designed for destroying cotton-boll worms, "sharp-shooters," and other insects destructive to crops; and the object is to provide a simple, inexpensive, and efficient device of this class adapted to display a light to attract the insects at night and to effectually precipitate them into a liquid, such as oil, when they come in contact with the deflecting-surfaces which converge toward the liquid-receptacle, and, moreover, to provide a device of this kind of such a construction as to protect the light against wind and rain, while exposing it sufficiently to attract the insects throughout a considerable area of a field of crops.

Further objects and advantages of this invention will appear in the following description, and the novel features thereof will be particularly pointed out in the appended claims, it being understood that in practice various changes in the form, proportion, and the minor details of construction may be resorted to without departing from the spirit or sacrificing any of the advantages of this invention.

Figure 1 is a view of a trap constructed in accordance with the invention. Fig. 2 is a vertical sectional view of the same.

Similar reference characters indicate corresponding parts in all the figures of the drawings.

The base of the trap preferably consists of an open-topped receptacle 1, preferably two feet or more square or in diameter, having side-keepers 2 for the reception of anchor-stakes 3, and rising centrally from the bottom of the receptacle is a pedestal or stand 4 to support a lamp 5 or other illuminating device, such as a candle, said support in the construction illustrated being peripherally flanged to prevent accidental displacement of the illuminating device. Extending radially from the stand and attached at their outer lower corners to the side walls of the receptacle are deflecting-wings 6, which thus by interposition between the central stand and the side walls serve as braces to the latter to prevent distortion of the receptacle. The wings preferably terminate near the upper edge of the receptacle, so as to afford no obstruction within the latter and permit free movement of the liquid, such as oil, which is preferably placed therein. Supported by the wings is an inverted conical deflector-shield 7, having a convex outer and lower surface, of which the portions are exposed between each two of the deflecting-wings, which extend approximately to the upper edge thereof. The exterior surface of the deflector-shield coöperates with the radial or inwardly-convergent wings to deflect insects inward and downward toward the receptacle, and thus insure their contact with the contents of the receptacle. The illuminating device is so arranged that the flame is located at the central opening formed by cutting away the apex of the cone, and hence while the flame is protected by the deflector-shield against side drafts the light is projected downwardly and is visible below the shield and between the inner separated edges of the wings. A removable cap 8 of conical construction, having a central opening 9, is fitted on the upper edge of the deflector-shield and is provided with a preferably downturned flange 10 to prevent displacement. The upper edge of the deflector-shield is also downturned to form a strengthening-flange 11, which also serves to prevent rain from beating into the device at this point. Such moisture as may enter the shield through the central opening of the cap is carried by the inner surface of the shield to a point below the flame, and thence passes into the receptacle. The concave inner surface of the cap serves as a reflector to increase the strength of the shaft of light which is projected downward through the central opening in the deflector-shield.

Having described the invention, what is claimed is—

1. An insect-trap having a receptacle, a central support for an illuminating device disposed above the bottom of the receptacle, deflecting-wings connecting said support with the side walls of the receptacle and spaced apart at their inner edges, an inverted conical deflector-shield supported by the wings and having an opening at its apex above the support, whereby an illuminating device on said support may be arranged with its flame within the shield, and a superposed light-reflecting cap covering the shield.

2. An insect-trap having a receptacle, a central support for an illuminating device disposed above the bottom of the receptacle, deflecting-wings connecting said support with the side walls of the receptacle and spaced apart at their inner edges, an inverted conical deflector-shield supported by the wings and having an opening at its apex above the support, whereby an illuminating device on said support may be arranged with its flame within the shield, and a superposed light-reflecting cap covering the shield, the cap being removable, and having a central opening and a downwardly-flanged periphery.

In testimony that I claim the foregoing as my own I have hereto affixed my signature in the presence of two witnesses.

SAMUEL RICHARD ESTEP.

Witnesses:
   A. H. L. DECKER,
   C. H. HARDING.